United States Patent
Chen et al.

(10) Patent No.: US 11,327,391 B2
(45) Date of Patent: May 10, 2022

(54) WAVELENGTH CONVERSION DEVICE AND PROJECTION DEVICE

(71) Applicant: Coretronic Corporation, Hsin-Chu (TW)

(72) Inventors: I-Hua Chen, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/207,757

(22) Filed: Mar. 22, 2021

(65) Prior Publication Data

US 2021/0349378 A1    Nov. 11, 2021

(30) Foreign Application Priority Data

May 8, 2020    (CN) .......................... 202010380672.5

(51) Int. Cl.
*G03B 21/20* (2006.01)
*G03B 21/16* (2006.01)

(52) U.S. Cl.
CPC .......... *G03B 21/204* (2013.01); *G03B 21/16* (2013.01); *G03B 21/2066* (2013.01)

(58) Field of Classification Search
CPC ... G03B 21/204; G03B 21/16; G03B 21/2066
See application file for complete search history.

(56) References Cited

U.S. PATENT DOCUMENTS

| | | | | |
|---|---|---|---|---|
| 2015/0316233 A1* | 11/2015 | Kawamata | ............... | F21V 13/08 29/428 |
| 2016/0077415 A1* | 3/2016 | Motoya | ................ | G03B 21/204 427/157 |
| 2017/0293211 A1* | 10/2017 | Kobayashi | ........... | G03B 21/204 |
| 2018/0052386 A1* | 2/2018 | Hashizume | .......... | G03B 21/006 |
| 2018/0275495 A1* | 9/2018 | Egawa | .................... | G03B 21/16 |
| 2018/0314140 A1* | 11/2018 | Liao | ....................... | G03B 33/08 |
| 2019/0041732 A1* | 2/2019 | Takagi | ............... | G02B 27/1006 |
| 2019/0049828 A1* | 2/2019 | Maeda | ................. | G03B 21/204 |

(Continued)

FOREIGN PATENT DOCUMENTS

| | | |
|---|---|---|
| CN | 104566230 | 7/2017 |
| CN | 105278225 | 5/2018 |

(Continued)

*Primary Examiner* — Bao-Luan Q Le
(74) *Attorney, Agent, or Firm* — JCIPRNET

(57) ABSTRACT

A wavelength conversion device includes a heat dissipation substrate, a first reflection layer, a second reflection layer, and a wavelength conversion layer. The first reflection layer is disposed on the heat dissipation substrate. The second reflection layer is disposed on the first reflection layer. The wavelength conversion layer is disposed on the second reflection layer. The first reflection layer is located between the heat dissipation substrate and the second reflection layer, and the second reflection layer is located between the first reflection layer and the wavelength conversion layer. A reflectivity of the second reflection layer to a visible light is greater than a reflectivity of the first reflection layer to the visible light, and a thickness of the first reflection layer is greater than or equal to a thickness of the second reflection layer. A projection device having the wavelength conversion device is further provided.

20 Claims, 1 Drawing Sheet

(56) References Cited

U.S. PATENT DOCUMENTS

| | | | | |
|---|---|---|---|---|
| 2019/0187545 A1* | 6/2019 | Arakawa | ............... | H04N 9/3164 |
| 2019/0338937 A1* | 11/2019 | Inoue | ........................ | F21V 7/24 |
| 2019/0361221 A1* | 11/2019 | Hsieh | ................... | H04N 9/3161 |
| 2019/0378960 A1* | 12/2019 | Chen | ..................... | G02B 5/0205 |
| 2020/0326615 A1* | 10/2020 | Hsu | ...................... | G02B 26/008 |
| 2020/0363710 A1* | 11/2020 | Ikeda | ...................... | G03B 33/08 |
| 2020/0371414 A1* | 11/2020 | Tsai | ................... | G03B 21/2066 |
| 2021/0132482 A1* | 5/2021 | Hsu | ...................... | H04N 9/3158 |

FOREIGN PATENT DOCUMENTS

| | | |
|---|---|---|
| CN | 106896631 | 11/2018 |
| CN | 208547768 | 2/2019 |
| TW | I572066 | 2/2017 |

\* cited by examiner

WAVELENGTH CONVERSION DEVICE AND PROJECTION DEVICE

CROSS-REFERENCE TO RELATED APPLICATION

This application claims the priority benefit of China application serial no. 202010380672.5, filed on May 8, 2020. The entirety of the above-mentioned patent application is hereby incorporated by reference herein and made a part of this specification.

BACKGROUND OF THE DISCLOSURE

1. Field of the Disclosure

The disclosure relates to an optical device and an electronic device, and more particularly, to a wavelength conversion device and a projection device.

2. Description of Related Art

A projection device is a display device for generating a large-size picture. With the evolution and innovation of science and technology, it has been continuously improving. An imaging principle of the projection device is to convert an illumination beam generated by an illumination system into an image beam via a light valve, and then project the image beam through a projection lens onto a projection target (such as a screen or a wall) to form a projection picture. In addition, with the market's requirements for the brightness, color saturation, service life, non-toxicity and environmental protection of the projection device, the illumination system has evolved from an ultra-high-performance (UHP) lamp and a light-emitting diode (LED) to a laser diode (LD) light source that is most advanced at present. However, in the illumination system, the current cost-effective way to produce a red light or green light is: emitting a blue excitation beam to a phosphor color wheel using a blue laser diode, and exciting a phosphor of the phosphor color wheel using the excitation beam to generate a yellow-green light. Then, the desired red light or green light is filtered via a filter element for use.

At present, a reflection layer of a reflective wavelength conversion device is divided into a specular reflection layer and a diffuse reflection layer. The specular reflection layer is mainly formed by coating a surface of a heat dissipation substrate with silver or alloy thereof, aluminum or alloy thereof, dielectrics, or a mixture of the foregoing. The coating is high in cost, prone to separation, limited in temperature resistance (a coating structure is easily destroyed when the temperature exceeds 300° C.), and thus limited in use.

On the other hand, white diffuse reflection particles of the diffuse reflection layer are titanium dioxide, silicon dioxide, aluminum oxide, zirconium oxide, barium sulfate, etc., which have an extremely high reflectivity (greater than or equal to 95%) within a wavelength range of a visible light but a low thermal conductivity (less than 10 W/mK), so when they are used in a high-power projector, the luminous efficiency of the phosphor is easily reduced due to excess temperature caused by a poor thermal conductivity. In addition, if the white diffuse reflection particles of the diffuse reflection layer are boron nitride, the reflectivity (greater than or equal to 70%) within the wavelength range of the visible light is lower than the reflectivity of diffuse reflection particles such as titanium dioxide, silicon dioxide, aluminum oxide, zirconium oxide, and barium sulfate. The diffuse reflection particles, boron nitride, have a high thermal conductivity (greater than 20 W/mK). Although thermal conduction is faster, the brightness of an optical engine is reduced due to a low reflectivity.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE DISCLOSURE

The disclosure provides a wavelength conversion device and a projection device, which can further increase a heat dissipation effect of the wavelength conversion device while maintaining a good reflectivity of the wavelength conversion device.

Other objectives and advantages of the disclosure may be further understood from the technical features disclosed in the disclosure.

In order to achieve one, some, or all of the aforementioned objectives or other objectives, the disclosure provides a wavelength conversion device, which includes a heat dissipation substrate, a first reflection layer, a second reflection layer, and a wavelength conversion layer. The first reflection layer is disposed on the heat dissipation substrate. The second reflection layer is disposed on the first reflection layer. The wavelength conversion layer is disposed on the second reflection layer. The first reflection layer is located between the heat dissipation substrate and the second reflection layer, and the second reflection layer is located between the first reflection layer and the wavelength conversion layer. A reflectivity of the second reflection layer to a visible light is greater than a reflectivity of the first reflection layer to the visible light, and a thickness of the first reflection layer is greater than or equal to a thickness of the second reflection layer.

In order to achieve one, some, or all of the aforementioned objectives or other objectives, the disclosure further provides a projection device, which includes an illumination system, an optical engine module, and a projection lens. The illumination system is configured to provide an illumination beam, and the illumination system includes at least one excitation light source and a wavelength conversion device. The at least one excitation light source is configured to provide at least one excitation beam. The wavelength conversion device is disposed on a transmission path of the at least one excitation beam. The wavelength conversion device includes a heat dissipation substrate, a first reflection layer, a second reflection layer, and a wavelength conversion layer. The first reflection layer is disposed on the heat dissipation substrate. The second reflection layer is disposed on the first reflection layer. The wavelength conversion layer is disposed on the second reflection layer. The optical engine module is disposed on a transmission path of the illumination beam and is configured to convert the illumination beam into an image beam. The projection lens is located on a transmission path of the image beam, and is configured to project the image beam. The first reflection layer is located between the heat dissipation substrate and the second reflection layer, and the second reflection layer is located between the first reflection layer and the wavelength conversion layer. A reflectivity of the second reflection layer to a visible light is greater than a reflectivity of the first reflection layer to the visible light, and a thickness of the first reflection layer is greater than or equal to a thickness of the second reflection layer.

Based on the foregoing, in the wavelength conversion device and the projection device of the disclosure, the wavelength conversion device includes a heat dissipation substrate, a first reflection layer, a second reflection layer, and a wavelength conversion layer from bottom to top. A reflectivity of the second reflection layer to a visible light is greater than a reflectivity of the first reflection layer to the visible light, and a thickness of the first reflection layer is greater than or equal to a thickness of the second reflection layer. In this way, a heat dissipation effect of the wavelength conversion device can be further increased while a good reflectivity is maintained. In addition, since the heat dissipation effect is better than that of the prior art, a brightness of an illumination system in the projection device can be further improved.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
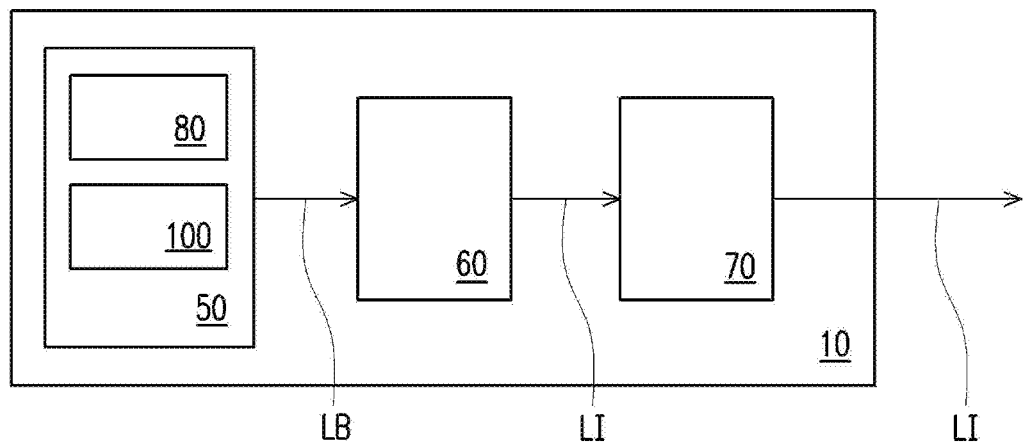
FIG. 1 is a schematic diagram of a projection device according to an embodiment of the disclosure.

FIG. 1 is a schematic diagram of a projection device according to an embodiment of the disclosure. Referring to FIG. 1, the embodiment provides a projection device 10, which includes an illumination system 50, an optical engine module 60, and a projection lens 70. The illumination system 50 is configured to provide an illumination beam LB. The optical engine module 60 is disposed on a transmission path of the illumination beam LB and is configured to convert the illumination beam LB into an image beam LI. The projection lens 70 is disposed on a transmission path of the image beam LI, and is configured to project the image beam LI out of the projection device 10 to a projection target (not shown). The projection target is, for example, a screen or a wall.

The illumination system 50 is configured to provide the illumination beam LB. In the embodiment, the illumination system 50 is composed of at least one light source, a wavelength conversion element, a light homogenizing element, a filter element, and a plurality of light splitting and combining elements, and is configured to provide lights with different wavelengths as an image beam source. For example, the illumination system 50 of the embodiment includes at least one excitation light source 80 and a wavelength conversion device 100. The excitation light source 80 is adapted to provide at least one excitation beam, and the wavelength conversion device 100 is disposed on a transmission path of the excitation beam. The excitation light source 80 may, for example, include one or more laser diodes arranged in an array. However, the disclosure does not limit the type or form of the illumination system 50 in the projection device 10, and the detailed structure and implementation thereof may be sufficiently taught, suggested, and implemented by subsequent descriptions and common knowledge in the technical field. Therefore, the descriptions thereof are omitted.

In the embodiment, the optical engine module 60 includes at least one light valve, such as a liquid crystal on silicon (LCoS) panel, a digital micro-mirror device (DMD), and other reflective light modulators. In some embodiments, the light valve may also be a transparent liquid crystal panel, an electro-optical modulator, a magneto-optic modulator, an acousto-optic modulator (AOM), and other penetrating light modulators. The disclosure does not limit the form and type of the optical engine module 60. The detailed structure and implementation of a method for converting the illumination beam LB into the image beam LI by the at least one light valve of the optical engine module 60 may be sufficiently taught, suggested, and implemented by common knowledge in the technical field. Therefore, the descriptions thereof are omitted. In the embodiment, there is one light valve in the optical engine module 60, such as the projection device 10 using a single digital micro-mirror device, but in other embodiments, there may be a plurality of light valves. The disclosure is not limited thereto.

The projection lens 70 includes, for example, one or a combination of more optical lenses having a diopter, for example, including various combinations of non-planar lenses such as a biconcave lens, a biconvex lens, a concavo-convex lens, a convexo-concave lens, a plano-convex lens, and a plano-concave lens. In an embodiment, the projection lens 70 may further include a flat optical lens, which projects the image beam LI from the optical engine module 60 to a projection target outside the projection device 10 in a reflective manner. The disclosure does not limit the form and type of the projection lens 70.

Figure 2:
FIG. 2 is a schematic diagram of a wavelength conversion device according to an embodiment of the disclosure.

FIG. 2 is a schematic diagram of a wavelength conversion device according to an embodiment of the disclosure. Referring to FIG. 2, the wavelength conversion device 100 includes a heat dissipation substrate 110, a first reflection layer 120, a second reflection layer 130, and a wavelength conversion layer 140. The first reflection layer 120 is disposed on the heat dissipation substrate 110, and the second reflection layer 130 is disposed on the first reflection layer 120. The first reflection layer 120 is located between the heat dissipation substrate 110 and the second reflection layer 130. The wavelength conversion layer 140 is disposed on the second reflection layer 130, and the second reflection layer 130 is located between the first reflection layer 120 and the wavelength conversion layer 140. In other words, the wavelength conversion device 100 includes the heat dissipation substrate 110, the first reflection layer 120, the second reflection layer 130, and the wavelength conversion layer 140, which are stacked sequentially from bottom to top. In the embodiment, there is no gap between the heat dissipation substrate 110, the first reflection layer 120, the second reflection layer 130, and the wavelength conversion layer 140. In the embodiment, the heat dissipation substrate 110 is, for example, a disk. The first reflection layer 120, the second reflection layer 130, and the wavelength conversion layer 140 are, for example, stacked on the heat dissipation substrate 100 in a ring shape or a partial ring shape. The wavelength conversion device 100 further includes a driving element (not shown). The driving element is connected to the center of the heat dissipation substrate and is configured to drive the heat dissipation substrate to rotate around the center thereof as a rotation axis, but the disclosure is not limited thereto.

A material of the heat dissipation substrate 110 is, for example, aluminum, aluminum alloy, copper, copper alloy, aluminum nitride, or silicon carbide. The heat dissipation substrate 110 is configured to allow heat received by the wavelength conversion device 100 to achieve a heat dissipation effect through the heat dissipation substrate 110. The wavelength conversion layer 140 has a phosphor material that is excited by the excitation beam provided by the excitation light source and generates converted beams with different wavelengths. The wavelength conversion layer 140 may be manufactured by sintering, but the disclosure is not limited thereto.

In addition, a reflectivity of the second reflection layer 130 to a visible light is greater than a reflectivity of the first reflection layer 120 to the visible light, and a thickness of the first reflection layer 120 is greater than or equal to a thickness of the second reflection layer 130. Specifically, in the embodiment, the reflectivity of the first reflection layer 120 to the visible light is, for example, greater than or equal to 70%, and the reflectivity of the second reflection layer 130 to the visible light is, for example, greater than or equal to 95%. In this way, the heat dissipation effect of the wavelength conversion device 100 can be further increased while a good reflectivity is maintained. In addition, since the heat dissipation effect is better than that of the prior art, the brightness of the illumination system 50 in the projection device 10 can be further improved.

In detail, in the embodiment, a thermal conductivity of the first reflection layer 120 is greater than a thermal conductivity of the second reflection layer 130. The thermal conductivity of the first reflection layer 120 is greater than or equal to 20 watts/(meter·Kelvin) (W/mK). In other words, the first reflection layer 120 is selected to be made of materials with a medium/high reflectivity and a high thermal conductivity. For example, the first reflection layer 120 has boron nitride or other types of mixed diffuse reflection particles disposed on the first reflection layer 120. On the other hand, the second reflection layer 130 is selected to be made of materials with a high reflectivity and a low thermal conductivity. The thermal conductivity of the second reflection layer 130 is, for example, less than or equal to 10 W/(mK). For example, the second reflection layer 130 has titanium dioxide, silicon dioxide, aluminum oxide, zirconium oxide, barium sulfate, or other types of mixed diffuse reflection particles disposed on the second reflection layer 130.

In the embodiment, the first reflection layer 120 and the second reflection layer 130 may be manufactured by sintering. The diffuse reflection particles may be using organic glue (such as silica gel), inorganic glue (such as glass glue) or organic-inorganic mixed glue (such as organic silica gel mixed with inorganic silicon oxide) as an adhesive between a structure surface thereof, but the disclosure is not limited thereto. In an embodiment, the first reflection layer 120 may also be a mirror coating formed on the surface of the heat dissipation substrate 110, and the disclosure is not limited thereto either.

The second reflection layer 130 is configured to reflect the converted beam converted from the excitation beam transmitted to the wavelength conversion layer 140 and transmit heat energy generated by the wavelength conversion layer 140 to the first reflection layer 120. Therefore, in the embodiment, the second reflection layer 130 may be low in thickness to increase the effect of transmitting heat to the first reflection layer 120. In an exemplary embodiment, the thickness of the second reflection layer 130 is less than or equal to 0.05 millimeter, and a sum of the thickness of the first reflection layer 120 and the thickness of the second reflection layer 130 is less than 0.15 millimeter. Therefore, the total thickness of the first reflection layer 120 and the second reflection layer 130 in the embodiment is similar to the thickness of a single reflection layer in the prior art, so the same reflection effect as the single reflection layer can be achieved.

In the embodiment, the wavelength conversion device 100 may be further explained by a thermal resistance equation. In detail, the thermal resistance equation may be expressed by the following formula (1) as follows:

$$R = \frac{L}{kA} \quad (1)$$

wherein

R is thermal resistance in K (Kelvin)/W (Watt);

L is a forward distance (or thickness) in m (meters);

k is a thermal conductivity in W (watt)/m (meter) K (Kelvin);

A is an area of thermal conduction penetration in m² (square meters).

For example, a single reflection layer in the prior art is taken as an example. If the thickness of the single reflection layer is 0.1 millimeter and a material is titanium dioxide (the thermal conductivity is 8.5 W/mK), when a thermal conduction area is 1 square meter, the thermal resistance R of the single reflection layer is 0.00001176 K/W. The embodiment is taken as an example. If the thickness of the first reflection layer 120 and the thickness of the second reflection layer 130 are both 0.05 millimeter, the material of the first reflection layer 120 is boron nitride (the thermal conductivity is 250 W/mK), and the material of the second reflection layer 130 is titanium dioxide (the thermal conductivity is 8.5 W/mK). Therefore, when the thermal conduction area is 1 square meter, the thermal resistance R of the first reflection layer 120 is 0.0000002 K/W, and the thermal resistance R of the second reflection layer 130 is 0.00000588 K/W. Therefore, the thermal resistance of double diffuse reflection layers (the first reflection layer 120 and the second reflection layer 130) in the embodiment may reach 0.00000608 K/W, while a ratio of thermal resistance in the single reflection layer embodiment to the embodiment is 1.93. In other words, the structure consisting of double diffuse reflection layers (that is, the first reflection layer 120 and the second reflection layer 130) in the embodiment has a better thermal conduction effect.

In the embodiment, the wavelength conversion device 100 further includes a connecting layer 150, disposed between the heat dissipation substrate 110 and the first reflection layer 120 and configured to fixedly connect the first reflection layer 120 to the heat dissipation substrate 110. In the embodiment, a thermal conductivity of the connecting layer 150 is greater than the thermal conductivity of the first reflection layer 120 and the thermal conductivity of the second reflection layer 130. In an exemplary embodiment, the thermal conductivity of the connecting layer 150 is greater than a sum of the thermal conductivity of the first reflection layer 120 and the thermal conductivity of the second reflection layer 130. Therefore, the connection strength between the first reflection layer 120 and the heat dissipation substrate 110 can be further improved, and the heat dissipation effect can be improved.

Based on the foregoing, in the wavelength conversion device and the projection device of the disclosure, the wavelength conversion device includes a heat dissipation substrate, a first reflection layer, a second reflection layer, and a wavelength conversion layer from bottom to top. A reflectivity of the second reflection layer to a visible light is greater than a reflectivity of the first reflection layer to the visible light, and a thickness of the first reflection layer is greater than or equal to a thickness of the second reflection layer. In this way, a heat dissipation effect of the wavelength conversion device can be further increased while a good reflectivity is maintained. In addition, since the heat dissipation effect is better than that of the prior art, a brightness of an illumination system in the projection device can be further improved.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A wavelength conversion device, wherein the wavelength conversion device comprises a heat dissipation substrate, a first reflection layer, a second reflection layer, and a wavelength conversion layer, wherein:
    the first reflection layer is disposed on the heat dissipation substrate;
    the second reflection layer is disposed on the first reflection layer; and
    the wavelength conversion layer is disposed on the second reflection layer, wherein the first reflection layer is located between the heat dissipation substrate and the second reflection layer, the second reflection layer is located between the first reflection layer and the wavelength conversion layer, a reflectivity of the second reflection layer to a visible light is greater than a reflectivity of the first reflection layer to the visible light, and a thickness of the first reflection layer is greater than or equal to a thickness of the second reflection layer.

2. The wavelength conversion device according to claim 1, wherein a thermal conductivity of the first reflection layer is greater than a thermal conductivity of the second reflection layer.

3. The wavelength conversion device according to claim 1, wherein a thermal conductivity of the first reflection layer is greater than or equal to 20 W/mK.

4. The wavelength conversion device according to claim 1, wherein the reflectivity of the first reflection layer to the visible light is greater than or equal to 70%.

5. The wavelength conversion device according to claim 1, wherein the reflectivity of the second reflection layer to the visible light is greater than or equal to 95%.

6. The wavelength conversion device according to claim 1, wherein the thickness of the second reflection layer is less than or equal to 0.05 millimeter.

7. The wavelength conversion device according to claim 1, wherein a sum of the thickness of the first reflection layer and the thickness of the second reflection layer is less than 0.15 millimeter.

8. The wavelength conversion device according to claim 1, wherein the wavelength conversion device further comprises a connecting layer, disposed between the heat dissipation substrate and the first reflection layer, and configured to fixedly connect the first reflection layer to the heat dissipation substrate, a thermal conductivity of the connecting layer being greater than the thermal conductivity of the first reflection layer and the thermal conductivity of the second reflection layer.

9. The wavelength conversion device according to claim 1, wherein the first reflection layer is a mirror coating formed on a surface of the heat dissipation substrate.

10. The wavelength conversion device according to claim 1, wherein there is no gap between the heat dissipation substrate, the first reflection layer, the second reflection layer, and the wavelength conversion layer.

11. A projection device, wherein the projection device comprises an illumination system, an optical engine module, and a projection lens, wherein:
the illumination system is configured to provide an illumination beam, and the illumination system comprises at least one excitation light source and a wavelength conversion device, wherein:
the at least one excitation light source is configured to provide at least one excitation beam; and
the wavelength conversion device is disposed on a transmission path of the at least one excitation beam, and the wavelength conversion device comprises a heat dissipation substrate, a first reflection layer, a second reflection layer, and a wavelength conversion layer, wherein:
the first reflection layer is disposed on the heat dissipation substrate;
the second reflection layer is disposed on the first reflection layer; and
the wavelength conversion layer is disposed on the second reflection layer;
the optical engine module is disposed on a transmission path of the illumination beam and is configured to convert the illumination beam into an image beam; and
the projection lens is disposed on a transmission path of the image beam, and is configured to project the image beam, wherein the first reflection layer is located between the heat dissipation substrate and the second reflection layer, the second reflection layer is located between the first reflection layer and the wavelength conversion layer, a reflectivity of the second reflection layer to a visible light is greater than a reflectivity of the first reflection layer to the visible light, and a thickness of the first reflection layer is greater than or equal to a thickness of the second reflection layer.

12. The projection device according to claim 11, wherein a thermal conductivity of the first reflection layer is greater than a thermal conductivity of the second reflection layer.

13. The projection device according to claim 11, wherein a thermal conductivity of the first reflection layer is greater than or equal to 20 W/mK.

14. The projection device according to claim 11, wherein the reflectivity of the first reflection layer to the visible light is greater than or equal to 70%.

15. The projection device according to claim 11, wherein the reflectivity of the second reflection layer to the visible light is greater than or equal to 95%.

16. The projection device according to claim 11, wherein the thickness of the second reflection layer is less than or equal to 0.05 millimeter.

17. The projection device according to claim 11, wherein a sum of the thickness of the first reflection layer and the thickness of the second reflection layer is less than 0.15 millimeter.

18. The projection device according to claim 11, wherein the wavelength conversion device further comprises a connecting layer, disposed between the heat dissipation substrate and the first reflection layer, and configured to fixedly connect the first reflection layer to the heat dissipation substrate, a thermal conductivity of the connecting layer being greater than the thermal conductivity of the first reflection layer and the thermal conductivity of the second reflection layer.

19. The projection device according to claim 11, wherein the first reflection layer is a mirror coating formed on a surface of the heat dissipation substrate.

20. The projection device according to claim 11, wherein there is no gap between the heat dissipation substrate, the first reflection layer, the second reflection layer, and the wavelength conversion layer.

* * * * *